3,827,874
METAL-WORKING FLUIDS CONTAINING MICRO-BIOCIDAL NAPHTHENYL IMIDAZOLINES

Phillip Adams, Murray Hill, and Alfonso N. Petrocci, Glen Rock, N.J., assignors to Millmaster Onyx Corporation, New York, N.Y.
No Drawing. Continuation-in-part of application Ser. No. 883,641, Dec. 9, 1969, now Patent No. 3,705,027. This application Oct. 18, 1972, Ser. No. 298,758
The portion of the term of the patent subsequent to Dec. 5, 1989, has been disclaimed
Int. Cl. A01n 9/22
U.S. Cl. 71—67          2 Claims

ABSTRACT OF THE DISCLOSURE

The use of 1-aminoethyl-2-naphthenyl imidazoline, having the structure:

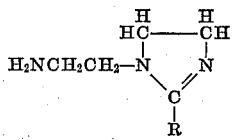

wherein R is the residue of a naphthene-carboxylic acid, as a microbiocidal preservative agent in metal working fluids.

---

This is a continuation-in-part of co-pending application Ser. No. 883,641, filed Dec. 9, 1969, and now issued as Pat. No. 3,705,027, dated Dec. 5, 1972. This invention relates to the microbiocidal use of 1-aminoethyl-2-naphthenyl imidazoline, having the structure:

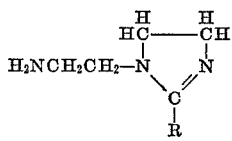

wherein R is the residue of a naphthene-carboxylic acid.

It has been discovered that the above naphthenyl imidazolines have a high order of microbiocidal effectiveness which is greatly superior to other imidazolines having different acid residues.

These compounds are especially useful as preservatives for metal-working lubricants, such as cutting and grinding fluids, against microbial decomposition which causes breaking of emulsions, putrefaction and the incidence of dermatitis resulting from the handling of contaminated or "spoiled" lubricants.

Naphthenic acids are well known to the art and are available commercially, primarily as the result of various extractive procedures carried out in refining naturally occurring petroleums and petroleum fractions, particularly gas-oil distillates boiling in the range of 400–700° F. Naphthenic acids are found particularly in petroleums originating in the western part of the United States, especially in California; in the northern part of South America, especially Venezuela, Colombia and Aruba; in the southern part of Europe, especially Rumania, and, to a lesser extent, in crude oils originating in Louisiana, along the Texas gulf coast, in Peru, Mexico, Poland, the Soviet Union and Germany.

The chemical nature of these naphthenic acids is more or less ill-defined, but they all have in common the characteristic of possessing alicyclic nuclei. These may be five or six membered carbon atom ring systems, various condensed ring systems, and other related materials as disclosed in Fieser, "Organic Chemistry," 3rd ed., 1956, pages 97–98.

EXAMPLE 1

2,324 grams (or 9.28 mols) of Enjay's Refined Naphthenic Acid having an acid number of 224, and 1,265 grams (or 12.07 mols) of diethylene triamine were charged into an agitated flask fitted with a packed fractionating column system for the purpose of separating and removing water formed in the reaction and returning stripped amine to the reactor. Aquametric titration of the charged amine indicated a water content of 1.17%.

The mixture was agitated and heated under reduced pressure at about 150° C. pot temperature and at 216 mm. pressure, gradually raising the pot temperature to about 200° C. during a period of about 12 hours. The water of reaction distilled along with some of the diethylene triamine, through the fractionating column, which stripped off the water and returned the amine to the reactor. When no more water distilled, the excess amine was distilled off at about 5 mm. pressure and 190° C.

The total amount of water collected was 321 grams; correcting for the initial water content, 17 mols of water was obtained, or 91.5% of the theoretical amount for the formation of the imidazoline.

A weighed sample was titrated potentiometrically to the first break with HCl in alcohol, indicating 87.4% activity. After reacting the non-tertiary nitrogen with phenyl isothiocyanate, titration with perchloric acid indicated 95.2% reaction.

The product was found to be effective against aerobic bacteria at from 25 to 150 parts per million at 37° C. during four hours.

EXAMPLE 2

The product was assayed bacteriologically by the Standard Broth Dilution Test Method. Aliquots of a solution of the aminoethyl naphthenyl imidazoline were added to appropriate broth culture media contained in test tubes, so that various concentrations were obtained. The tubes so prepared were inoculated with 24 hours broth cultures of the test bacteria, or 14 day aqueous spore suspensions of the test fungi, or 7 day broth cultures of the algae. The inoculated tubes were incubated as follows: bacteria for 72 hours at 37° C.; fungi for 14 days at 28° C.; algae for 7 days at 25° C. Following the aforementioned incubation periods, the tubes were examined for the presence or absence of macroscopic growth. The lowest concentration of test material not permitting macroscopic growth is designated as the Minimum Inhibitory Level.

The test organisms employed were:

Escherichia coli _____ E.c.
Pseudomonas aeruginosa _____ Ps. a.
Staphylococcus aureus _____ S.a.
Streptococcus faecalis _____ S.f.
Aspergillus niger _____ A.n.
Penicilium expansum _____ P.e.
Chlorella pyrenoidosa _____ C.p.

TABLE I

Parts per million of 1-aminoethyl-2-naphthenyl imidazoline

Gram Negative:
| | |
|---|---|
| E.c. | 10 |
| Ps. a. | 250 |

Gram Positive:
| | |
|---|---|
| S.a. | 10 |
| S.f. | 10 |

Fungi:
| | |
|---|---|
| A.n. | 500 |
| P.e. | 500 |
| C.p. | 10 |
| Algae C.p. | 10 |

These compounds may be employed either as the free amines or as their salts of inorganic or organic acids. Such acids may include, for example, hydrochloric, sulfuric, phosphoric, acetic, lauric, oleic, gluconic, oxalic, tartaric, citric, benzoic and substituted benzoic, paratoluene sulfonic, sulfamic, and the like.

The present compounds are especially useful when introduced into metal-working fluids, to preserve them against microbial action which results in decomposition and putrefaction, or breaking of emulsions, or to prevent dermatitis resulting from contact with spoiled cutting and grinding oils and the like.

Cutting and grinding fluids and especially the water-soluble or water-dispersible types containing, for example, the amine soaps, and salts of organic phosphate esters, tallow soaps, mahogany soaps and other hydrocarbon sulfonates, were effectively preserved against microbial action over a period of weeks by the addition of about 200 parts per million of the imidazoline in the lubricant as diluted for use.

The following examples serve as illustrations of some specific metal-working fluid formulations containing effective amounts of a comupound embodying the present invention:

EXAMPLE 3

A phosphate ester type metal-working fluid

| Components: | Parts by Weight |
|---|---|
| Antara "LS–500" (phosphate ester) | 10.0 |
| Triethanolamine | 20.0 |
| Sodium nitrite | 4.0 |
| 1-aminoethyl-2-naphthenyl imidazoline | 1.0 to 2.0 |
| Water, Q.s. | 100.0 |

EXAMPLE 4

A petroleum sulfonate type metal-working fluid

| Components: | Parts by Weight |
|---|---|
| Humble Oil Co. "Acto 630" (petroleum sulfonate) | 33.0 |
| Hume Oil Co. "Acto 639" (petroleum sulfonate) | 33.0 |
| Mineral spirits (i.e. Humble Oil Co.) "Bayol 90" | 32.0 to 33.0 |
| 1 - aminoethyl-2-naphthenyl imidazoline | 1.0 to 2.0 |

Concentrations of the preservative may vary widely in accordance with manufacturer's specifications and end use of the products. However, in final dilution, the end product should preferably contain a minimum of 200 p.p.m. of the preservative relative to the total composition. This proportion may be increased as desired.

The invention claimed is:

1. A method of inhibiting the growth of bacteria, fungi and algae in metal-working cutting and grinding fluids which comprises applying to the growth in said fluids an amount sufficient to inhibit such growth of the compound 1-aminoethyl-2-naphthenyl imidazoline or a salt thereof.

2. The method of claim 1 wherein said salt is selected from the group consisting of the hydrochloric, sulfuric, phosphoric, acetic, lauric, oleic, gluconic, oxalic, tartaric, citric, benzoic, paratoluene sulfonic and sulfamic acid salts.

References Cited

UNITED STATES PATENTS

| | | | |
|---|---|---|---|
| 2,738,325 | 3/1956 | Rydell | 424—273 |
| 2,832,715 | 4/1958 | Jezl et al. | 424—30 |
| 3,251,662 | 5/1966 | Fareri et al. | 424—273 |
| 3,502,578 | 3/1970 | Raifsnider | 210—309.6 |
| 3,705,027 | 12/1972 | Adams et al. | 424—273 |

JAMES O. THOMAS, JR., Primary Examiner

U.S. Cl. X.R.

21—58; 424—273